US012476702B1

(12) United States Patent
Singh

(10) Patent No.: US 12,476,702 B1
(45) Date of Patent: *Nov. 18, 2025

(54) METHODS AND DEVICES TO GENERATE A SPECTRUM UTILIZATION MAP FOR DEVICES IN SPOT BEAMS SERVED BY A MOBILE SATELLITE SERVICE NETWORK

(71) Applicant: Telcom Ventures, LLC, Miami, FL (US)

(72) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,095

(22) Filed: Jul. 10, 2025

(51) Int. Cl.
*H04B 7/185* (2006.01)
*H04B 17/318* (2015.01)
*H04W 24/08* (2009.01)

(52) U.S. Cl.
CPC ....... *H04B 7/18539* (2013.01); *H04B 17/318* (2015.01); *H04W 24/08* (2013.01)

(58) Field of Classification Search
CPC ........ H04B 1/66; H04B 17/00; H04B 17/318; H04B 17/391; H04B 7/18508; H04B 7/18523; H04B 7/18576; H04B 7/1853; H04B 7/18539
See application file for complete search history.

(56) References Cited

U.S. PATENT DOCUMENTS

| | | | |
|---|---|---|---|
| 9,819,410 B1 * | 11/2017 | Azevedo | H04B 7/18515 |
| 12,342,181 B1 * | 6/2025 | Singh | H04W 16/14 |
| 2014/0045420 A1 * | 2/2014 | Tong | H04B 7/18506 455/12.1 |
| 2016/0095109 A1 * | 3/2016 | Scott | H04B 7/18539 370/229 |
| 2021/0367663 A1 * | 11/2021 | Ravishankar | H04W 72/0446 |
| 2022/0030532 A1 * | 1/2022 | Hajir | H04B 7/18513 |
| 2022/0201519 A1 * | 6/2022 | Huang | H04L 5/0091 |
| 2024/0187874 A1 * | 6/2024 | Liu | H04B 7/18506 |

FOREIGN PATENT DOCUMENTS

| | | | | |
|---|---|---|---|---|
| CA | 2175107 A1 | * | 12/1996 | H04B 7/02 |
| CA | 3116223 C | * | 4/2024 | H04J 14/02 |
| KR | 102759858 B1 | * | 2/2025 | H04L 5/005 |
| WO | WO-2023220289 A1 | * | 11/2023 | H04B 7/18534 |

* cited by examiner

*Primary Examiner* — Mong-Thuy T Tran
(74) *Attorney, Agent, or Firm* — Myers Bigel, P.A.

(57) ABSTRACT

Disclosed are methods for allocating spectrum by a Mobile Satellite Service (MSS) satellite to a User Equipment (UE). The method includes monitoring, by the MSS satellite, radio spectrum in a plurality of spot beams of the MSS satellite, determining a spectrum usage map of the radio spectrum in a first spot beam of the plurality of spot beams, where the spectrum usage map includes available frequency bands comprising licensed frequency bands and unlicensed frequency bands, and transmitting the spectrum usage map for use by the UE in the first spot beam. Related wireless electronic devices are also discussed.

30 Claims, 9 Drawing Sheets

METHODS AND DEVICES TO GENERATE A SPECTRUM UTILIZATION MAP FOR DEVICES IN SPOT BEAMS SERVED BY A MOBILE SATELLITE SERVICE NETWORK

BACKGROUND

Various embodiments described herein relate to methods, devices, and computer program products for communication networks, and more particularly to wireless communication networks that include satellite communication.

Mobile Satellite Service (MSS) Networks for wireless user equipment (UEs), the Internet, Internet of Things (IoT) devices and many other applications are growing in coverage and usage scenarios. Networks using thousands of Low Earth Orbit (LEO) satellites are planned for launch. These MSS networks are to be used in areas where there is little or no coverage provided by terrestrial networks, such as wired or wireless networks. Wired networks are more available in populated areas using cable, fiber, or fixed networks. In less populated areas, there may be limited or no available terrestrial networks. In such areas, an MSS network, which can directly connect to the UEs and other applications in use, such as farming or transportation, is predicted to achieve widespread use.

Radio spectrum is a natural resource that is in limited supply. An efficient use of radio spectrum is, therefore, highly desirable.

SUMMARY

Various embodiments of the present invention are directed to a method of allocating spectrum by a Mobile Satellite Service (MSS) satellite to a User Equipment (UE). The method includes monitoring, by the MSS satellite, radio spectrum in a plurality of spot beams of the MSS satellite, determining a spectrum usage map of the radio spectrum in a first spot beam of the plurality of spot beams, where the spectrum usage map includes available frequency bands including licensed frequency bands and unlicensed frequency bands, and transmitting the spectrum usage map for use by the UE in the first spot beam.

The monitoring of the radio spectrum in the plurality of spot beams of the MSS satellite may include receiving, by the MSS satellite, signals in a plurality of frequency bands from one or more UEs that are in the plurality of spot beams, and measuring respective signal strengths of the signals in the plurality of frequency bands from the one or more UEs that are in the plurality of spot beams. Ones of the plurality of frequency bands may each include a plurality of sub-bands. The spectrum usage map may include sub-bands among the plurality of sub-bands of the ones of the plurality of frequency bands that are suitable for the UE to use in the first spot beam.

According to some embodiments, the method may further include determining sub-bands of the plurality of sub-bands of the ones of the plurality of frequency bands whose respective received signal strengths are below a threshold, and selecting the sub-bands whose respective received signal strengths are below the threshold for the spectrum usage map for use by the UE in the first spot beam. The plurality of spot beams of the MSS satellite may be directed towards earth at respective angles. Antennas of the MSS satellite may be configured to transmit and/or receive data in a plurality of frequency bands comprising the available frequency bands. The plurality of frequency bands may be used for communication in the plurality of spot beams of the MSS satellite. Respective gains of the antennas may be pre-calibrated for respective angles associated with ones of the plurality of spot beams.

According to some embodiments, the method may further include measuring respective signal strengths of signals in the plurality of frequency bands from one or more UEs that are in the plurality of spot beams. Antennas of the MSS satellite may be configured to transmit and/or receive data in a plurality of frequency bands including the available frequency bands. The monitoring of the radio spectrum in the plurality of spot beams of the MSS satellite may include measuring, in the first spot beam that is assigned a first frequency band, respective signal strengths of signals in ones of the plurality of frequency bands associated with ones of the plurality of spot beams other than the first spot beam, and selecting one or more sub-bands of the first frequency band that is suitable for use by the UE in the first spot beam.

Various embodiments of the present invention are directed to a method of communication by a User Equipment (UE) in a communication network served by a Mobile Satellite Service (MSS) satellite. The method includes receiving, by the UE, a spectrum usage map including one or more licensed frequency bands and one or more unlicensed frequency bands available for use by the UE, selecting a communication frequency band among the one or more licensed frequency bands or the one or more unlicensed frequency bands for communication in a first spot beam with the MSS satellite, and establishing, by the UE, a communication link with the MSS satellite using the communication frequency band that was selected.

According to some embodiments, receiving the spectrum usage map by the UE may include receiving the spectrum usage map directly from the MSS satellite. According to some embodiments, receiving the spectrum usage map by the UE may include receiving the spectrum usage map indirectly from the MSS satellite via a terrestrial Broadband Wireless Access (BWA) base station.

According to some embodiments, the method may further include establishing, by the UE, a session with the MSS satellite on a designated frequency band based on the spectrum usage map. The method may further include receiving, by the UE from the MSS satellite, an order for the UE switching to a different frequency band. The UE switching may include switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands.

According to some embodiments, the communication frequency band that was selected by the UE to communicate with the MSS satellite may include a first frequency band among a plurality of frequency bands that is assigned to a first spotbeam among a plurality of spot beams in which the UE is located or a first frequency sub-band in the first frequency band. The spectrum usage map may be based on monitoring radio spectrum in a plurality of spot beams by the MSS satellite. The spectrum usage map may be based on measuring respective signal strengths of signals in the plurality of frequency bands from one or more UEs that are in the plurality of spot beams. Ones of the plurality of frequency bands may each include a plurality of sub-bands. The spectrum usage map may include sub-bands among the plurality of sub-bands of the ones of the plurality of frequency bands that are suitable for the UE to use in the first spot beam. The plurality of spot beams of the MSS satellite may be directed towards earth at respective angles. The UE may be configured to transmit and/or receive data in a communication frequency band to and/or from one or more antennas of the MSS satellite, where the communication frequency band may be used for communication in the first spot beam of the MSS satellite. respective gains of the one of more antennas of the MSS satellite may be pre-calibrated for respective angles associated with ones of a plurality of spot beams comprising the first spot beam.

Various embodiments of the present invention are directed to a method of allocating spectrum by a Mobile Satellite Service (MSS) satellite to a User Equipment (UE). The method includes creating, by the MSS satellite, a blanking interval among downlink transmission intervals in a spot beam in a frequency band, receiving, by the MSS satellite, signals from one more UEs in the frequency band during the blanking interval, measuring respective signal strengths of the signals from the one more UEs in the frequency band, determining a spectrum usage map of radio spectrum in the spot beam based on the respective signal strengths, wherein the spectrum usage map comprises available frequency bands comprising licensed frequency bands and unlicensed frequency bands, and transmitting the spectrum usage map to the UE in the spot beam.

Various embodiments of the present invention are directed to a wireless electronic device associated with a Mobile Satellite Service (MSS) satellite. The wireless electronic device is configured to allocate spectrum to a User Equipment (UE). The wireless electronic device includes a transceiver, and a processor coupled to a memory. The memory is configured to store instructions that cause the processor to perform operations including monitoring, by the MSS satellite, radio spectrum in a plurality of spot beams of the MSS satellite, determining a spectrum usage map of the radio spectrum in a first spot beam of the plurality of spot beams, where the spectrum usage map may include available frequency bands including licensed frequency bands and unlicensed frequency bands. The transceiver is configured to transmit the spectrum usage map to the UE in the first spot beam.

Various embodiments of the present invention are directed to a wireless electronic device associated with a User Equipment (UE) in a communication network served by a Mobile Satellite Service (MSS) satellite. the wireless electronic device includes a transceiver, and a processor coupled to a memory. The memory is configured to store instructions that cause the processor to perform operations including receiving, a spectrum usage map comprising one or more licensed frequency bands and one or more unlicensed frequency bands available for use by the UE, selecting a communication frequency band among the one or more licensed frequency bands and the one or more unlicensed frequency bands for communication in a first spot beam with the MSS satellite, and establishing, using the transceiver, a communication link with the MSS satellite using the communication frequency band that was selected.

Various embodiments of the present invention are directed to a wireless electronic device associated with a Mobile Satellite Service (MSS) satellite. The wireless electronic device is configured to allocate spectrum to a User Equipment (UE). The wireless electronic device includes a transceiver, and a processor coupled to a memory. The memory is configured to store instructions that cause the processor to perform operations including creating, by the MSS satellite, a blanking interval among downlink transmission intervals in a spot beam in a frequency band, receiving, by the MSS satellite, signals from one more UEs in the frequency band during the blanking interval, measuring respective signal strengths of the signals from the one more UEs in the frequency band, determining a spectrum usage map of radio spectrum in the spot beam based on the respective signal strengths, wherein the spectrum usage map comprises available frequency bands comprising licensed frequency bands and unlicensed frequency bands, and transmitting the spectrum usage map to the UE in the spot beam.

DETAILED DESCRIPTION

Figure 1:
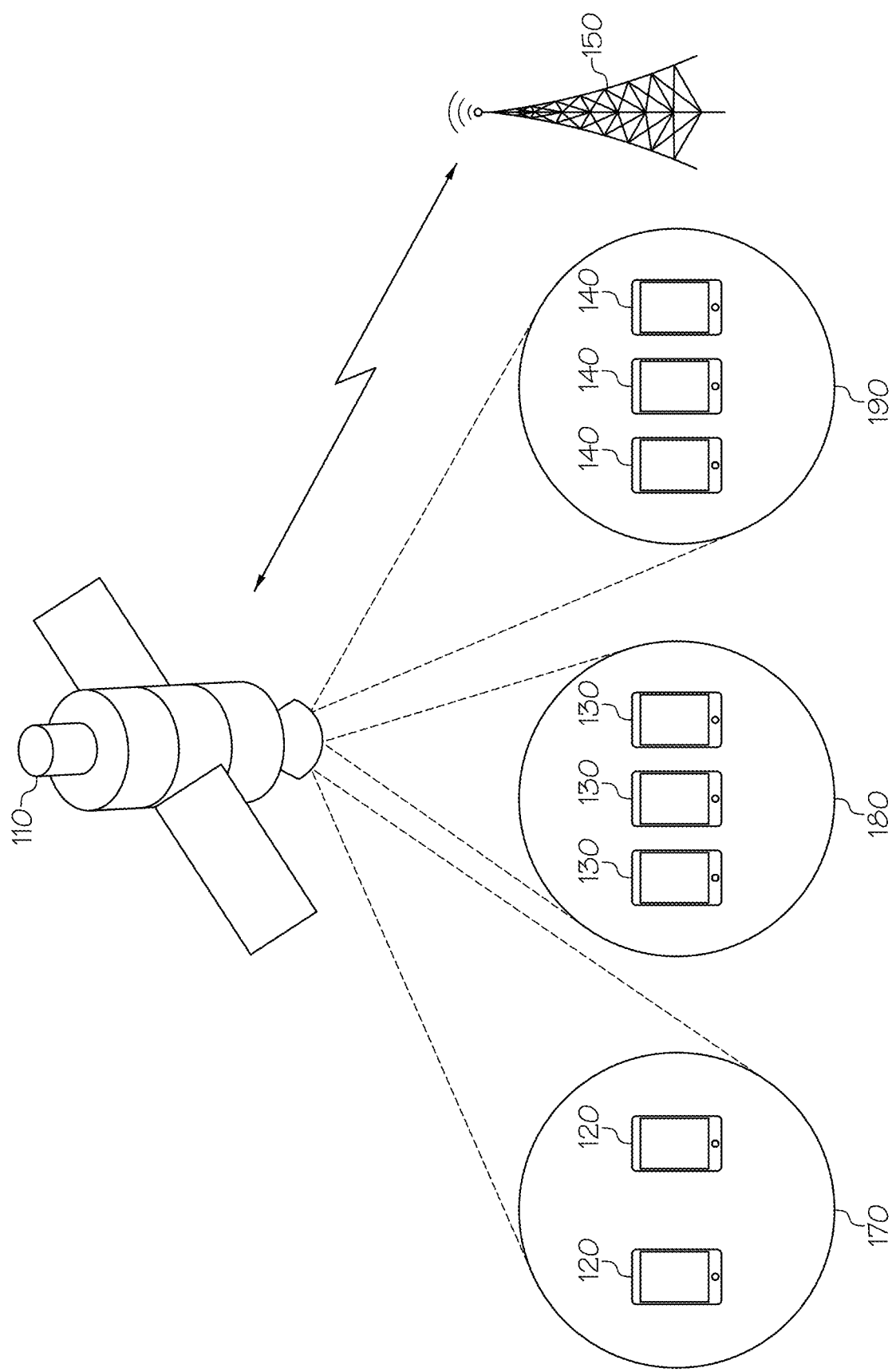
FIG. 1 is a diagram illustrating spot beams with User Equipment (UEs) located therein, that are served by a Mobile Satellite Service (MSS) satellite, according to some embodiments of the present inventive concepts.

Terrestrial mobile service coverage, such as cellular networks, may extend around population centers, but rural and less dense areas may not have adequate terrestrial mobile service. Vast areas of the globe are not covered by cellular mobile networks. There is a significant interest in providing mobile services to these uncovered areas using a standard user equipment (UE). Beyond UEs, this service, according to embodiments described herein, may also have other applications such as IoT, land transportation, and marine transportation.

Methods and devices are provided herein to determine to what extent radio spectrum is available in a given spot beam of a MSS system. This availability of radio spectrum in a spot beam may be used by a system to directly connect a UE to a MSS satellite. Satellite radio spectrum may be shared with terrestrial Broadband Wireless Access (BWA) radio spectrum. Furthermore, satellite communications may use unlicensed spectrum for communication, in some circumstances. Spectrum may be used for Mobile Satellite Service (MSS) uplink (earth to space) and downlink (space to earth).

Licensed spectrum around the world is limited. However, there is significant allocation of unlicensed spectrum which may be used in conjunction with limited, licensed spectrum to provide Direct to Device (DtD) service for voice, data, messaging, video, and other services. Techniques described herein apply to any combination of different licensed and unlicensed bands, depending on network configuration.

A MSS space network is capable of monitoring the utilization of radio spectrum in real time in its coverage area, including frequency bands in use and signal quality. The MSS space network may be capable of using portions of the licensed spectrum and other bands outside of the license spectrum which may be unlicensed radio spectrum bands or licensed to third parties, depending on the antennas and payload available on the satellite.

A satellite may be designed with a capability to monitor the bands of the radio spectrum to create a real time map of spectrum utilization.

Mobile Satellite Service networks may have limitations because of the transmit/receive antenna arrays, power limitations, and the licensing rules for radio spectrum in different geographical areas. A vast majority of radio spectrum is underutilized across most of the globe, especially outside of population centers. Discussed herein are methods to enable efficient use of radio spectrum that is licensed, unlicensed, and/or licensed to third parties for use by a MSS network in various spot beams from the MSS satellite.

Weight and power consumption are among the limitations for an MSS network satellite. It may be desirable to use the same payload on board a MSS satellite which are used for network connections to generate a Spectrum Utilization Map (SUM). According to various embodiments described herein, a Spectrum Utilization Map may be generated using the payload which is already present on the MSS satellite, without the use of additional hardware systems that may add additional weight, power requirements, and/or space requirements to the satellite.

FIG. 1 is a diagram illustrating spot beams with User Equipment (UEs) located therein, that are served by a Mobile Satellite Service (MSS) satellite, according to some embodiments of the present inventive concepts. Referring now to FIG. 1, a MSS satellite 110 may be communicating with MSS-capable UEs 120, 130, 140 in spot beams 170, 180, and 190. Spot beams are areas covered by the MSS satellite as the satellite orbits the earth. The geographical area covered by a spot beam changes as the satellite orbits the earth. Some geographical areas may include a terrestrial base station 150. UEs 120, 130, 140 may communicate with the terrestrial base station 150 and/or may directly communicate with MSS satellite 110. An MSS Control Station (not pictured) may be terrestrially based and may serve as a repeater for the MSS satellite 110. The MSS Control Station may serve to conserve power for signals from the MSS satellite 110. The MSS Control Station may assist in the frequency assignment, monitor terrestrial conditions around the UEs 120, 130, 140, monitor unlicensed spectrum in the geographical vicinity, etc., according to various embodiments described herein. UEs 120, 130, 140 may be in direct communication with the MSS satellite 110.

A MSS satellite may provide coverage to a given area using multiple spot beams. Each spot beam may cover a given geographical area at any given time. As a satellite orbits the earth, a spot beam from the satellite may move over new geographical areas and the next spot beam may cover the given geographical area. The given geographical area may be covered by a spot beam, but other spot beams may measure the spectrum usage in the area covered by the spot beam by measuring the earth to space (uplink) signal strength.

Figure 2:
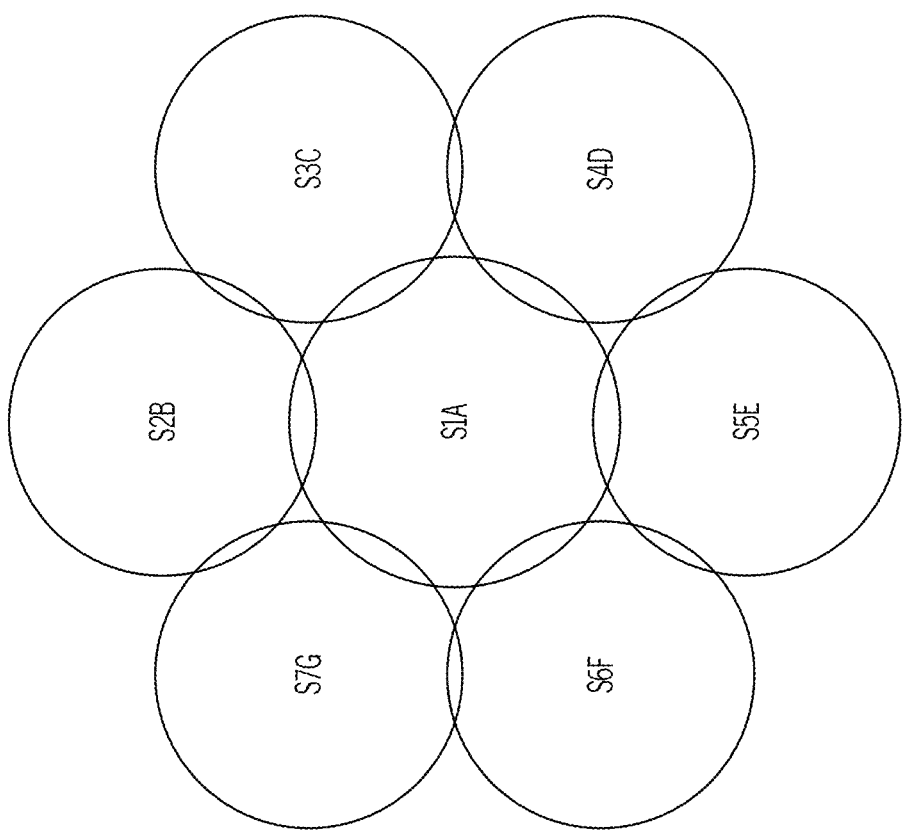
FIG. 2 illustrates various spot beams from an MSS satellite and frequency spectrum allocated to the various spot beams, according to some embodiments of the present inventive concepts.

FIG. 2 illustrates various spot beams and frequency spectrum allocated to the various spot beams, according to some embodiments of the present inventive concepts. In this non-limiting example, spot beam S1 may be using spectrum band A, S2 may be using spectrum band B, S3 may be using spectrum band C, S4 may be using spectrum band D, S5 may be using spectrum band E, S6 may be using spectrum band F, and S7 may be using spectrum band G.

Various embodiments described herein arise from the recognition that pre-calibration of the antenna array of the satellite may be performed to determine the radio spectrum that is in use and/or the geographical use of the radio spectrum. The MSS satellite 110 may monitor the radio spectrum in a plurality of spot beams to determine spectrum usage to create a spectrum usage map that is sent to the UEs 120, 130, 140.

A satellite antenna array gain pattern may be determined ahead of time in all or most directions for spectrum bands of interest. This determination of the gain pattern may allow, for example, spot beams to measure the use of the spectrum band A of FIG. 2 in the area covered by spot beam S1 by measuring the received signal strength in spectrum band A. Similarly, spot beams may perform the same task in the areas covered by other spot beams. A goal of various embodiments described herein may be to use the payload, the antenna for transmit and receive, and other systems already on the satellite to obtain a spectrum usage map. In this regard, it may be useful to calibrate an antenna gain over a wide range of angles (i.e., directions) to the earth and also over the wide range of spectrum. For use in real life scenarios, it may be desired to determine the spectrum band in use and out of band usage in the adjacent spectrum bands. While a given band (or sub-band) is in use, the signal strengths in the adjacent bands may be measured, since the antenna is pre-calibrated. As discussed earlier, this allows capturing overall activity in the adjacent beams, but also use of various frequency bands and/or sub-bands using channel sounding and other corrections.

The antenna array may be pre-calibrated for the angle of arrival of signals and for frequency bands. Therefore, adjustments may be performed regarding the use of spectrum bands (i.e., frequency bands) in the areas covered by the other spot beams. In the area covered by the spot beam for its own use, the MSS satellite may use blanking intervals in spot beam S1 in the downlink to measure signal strength received from users which may be UEs other than from its own network in the licensed or unlicensed bands of interest. Blanking intervals may be periods of time that the frequency band is not used for communication with UEs. The blanking intervals in the downlink may be used in multiple spot beams simultaneously to obtain a collective assessment regarding usage by UEs which are not part of the network served by the MSS satellite. By listening before transmitting during the blanking intervals, a collective assessment may be performed regrading frequency band and/or sub-band usage. Dynamic assessment and/or assignment of frequency bands or frequency sub-bands in any given spot beam may be accomplished. These assessment and/or assignment of frequency bands or frequency sub-bands may be performed on board the MSS satellite, coordinated by a ground station, performed by a repeater station, and or performed by a BWA base station. According to some embodiments, the assessment and/or assignment of frequency bands or frequency sub-bands do not need to be performed by the same entity.

In some embodiments, blanking intervals may be used to measure signal strength for out-of-network users. The MSS satellite may cease transmission in a given spot beam for a small fraction of time to listen. This may allow the MSS satellite to measure the signal strength from out-of-network users in the uplink. For example, referring once again to FIG. 2, spot beam S1 may be using frequency band A. The MSS satellite may stop all transmissions on band A in spot beam S1 for a small time interval and measure the use of frequency band A by out-of-network UEs and/or measure the power level of the usage by the out-of-network UEs.

Measuring the power level of signals from one or more UEs used in the neighboring spot beams may be performed. As shown in FIG. 2, for example, spot beam S1 may not use spectrum band D due to spectrum reuse rule and/or constraints. Spot beam S1 may measure the power level of use of the uplink (earth to space) on spectrum band D and provide this information in real time to the network for the use of spectrum in spot beam D. A reuse pattern may be designed such that spot beam S1 may measure the power level of the use of spectrum band D while using spectrum band A for the actual use for the UEs in their coverage areas (i.e., not for the measuring power level of use). This allows the MSS satellite network to coordinate use of various spectrum bands across various spot beams in real time, as the satellite orbits the earth.

Various embodiments described herein allow a MSS satellite to have complete assessment of the level of use in all spectrum bands in real-time. For example, in FIG. 2, the MSS satellite may be aware of the usage in spectrum bands A, B, C, D, E, F, and G. This arrangement of spot beam reuse patterns may allow a real-time measurement of spectrum usage over the range of spectrum which may be used by a MSS satellite.

Adjustments may be performed for morphological or other factors. The signal strength received by a spot beam from UEs or other devices such as IoT devices, vehicles, or systems for tracking of goods, etc. in its coverage area may be impacted by natural elements (trees, foliage, etc.) and/or man-made structures. In some embodiments, spot beams may make use of channel sounding methods. For example, still referring to FIG. 2, spot beam S1 may connect with several UEs in its coverage area and direct these UEs to send a signal back to the MSS satellite with the received signal strength. Using a large number of such transmissions, spot beam S1 may calibrate the impact of man-made structures and natural elements during the real-life use of its network to connect UEs on the ground. The objective would be to maintain power flux density on the ground within the range, as not to cause interference to other users which may not be part of the network of the satellite. The power flux density (PFD) refers to the amount of radio power passing through a unit area, typically measured in Watts per square meter ($W/m^2$) or $dBW/m^2$. In satellite communication, the power flux density may be important for ensuring compatibility and preventing interference between different satellite systems and with terrestrial services. UEs on the ground may communicate with other users in the vicinity to make sure these UEs are following the band sharing rules for the use of the spectrum.

Various embodiments described here provide pre-launch and post-launch calibration mechanisms of the satellite. Post-launch calibration of real-life factors such as morphology such as foliage or man-made structures is useful in selecting frequency bands or sub-bands for use by particular UEs. This also may be done by other systems based on spectrum bands and geographical areas of interest. Pre-calibration is likely to be more accurate if done by the MSS network in use. In some embodiments, use of transmit blanking intervals for farther calibration may be utilized. Real-time measurement of the level of use in a spot beam coverage area by neighboring spot beams may be performed.

Still referring to FIG. 2, overlapping of the spot beams may allow fine tuning of the geographical usage of the different spectrum bands A, B, C, D, E, F, G of FIG. 2. In other words, edge regions of the spot beams may overlap one another, as illustrated in FIG. 2.

Figure 3:
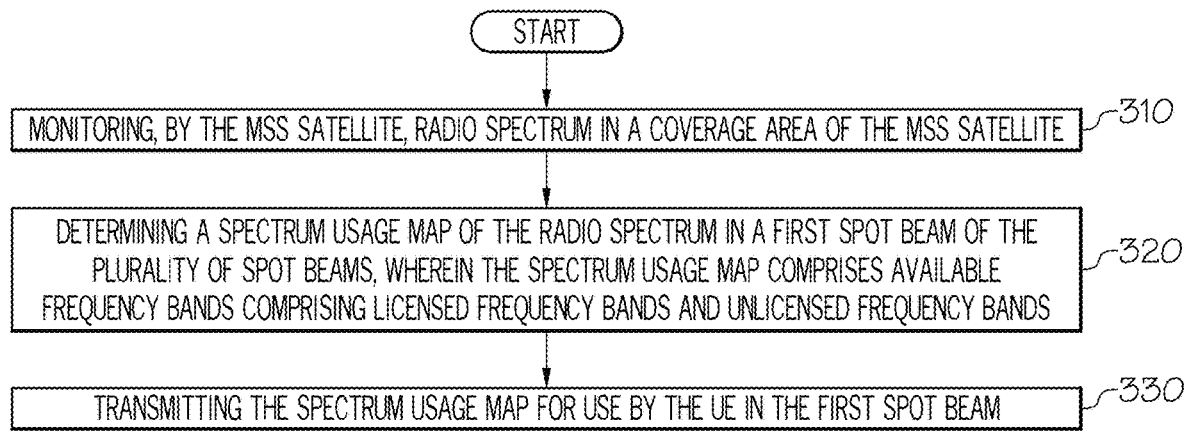
FIGS. 3 to 12 are flowcharts illustrating operations for allocating spectrum of a MSS satellite to a UE, according to some embodiments of the present inventive concepts.

FIGS. 3 to 12 are flowcharts illustrating operations for allocating spectrum by a MSS satellite to a UE, according to some embodiments of the present inventive concepts. Referring to FIG. 3, monitoring, by the MSS satellite 110, radio spectrum in a plurality of spot beams of the MSS satellite 110 is performed, at block 310. A spectrum usage map of the radio spectrum is determined in a first spot beam 170 of the plurality of spot beams 170, 180, 190, at block 320. The spectrum usage map includes frequency bands that include licensed frequency bands and unlicensed frequency bands. The method includes transmitting the spectrum usage map for use by the UE 120 in the first spot beam 170, at block 330.

Figure 4:
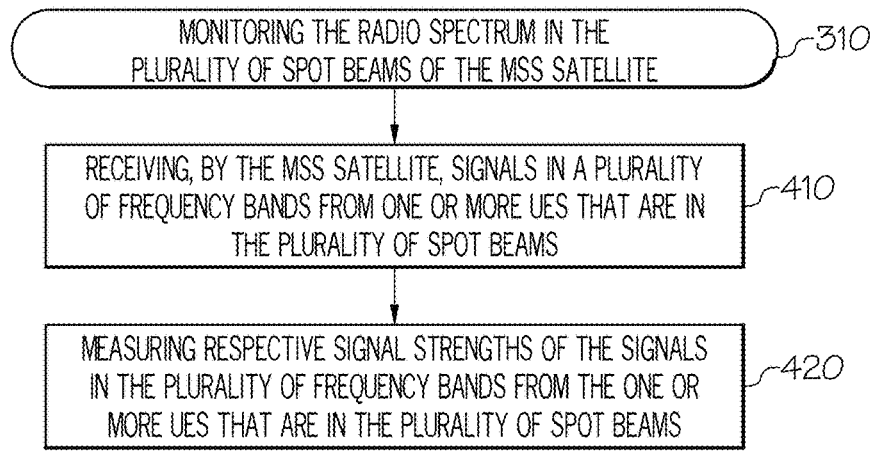

Referring to FIG. 4, according to some embodiments, the monitoring of the radio spectrum in the plurality of spot beams of the MSS satellite, at block 310, may include receiving, by the MSS satellite, signals in a plurality of frequency bands from one or more UEs that are in the plurality of spot beams, at block 410. The monitoring of the radio spectrum in the plurality of spot beams of the MSS satellite, at block 310, may include measuring respective signal strengths of the signals in the plurality of frequency bands from the one or more UEs that are in the plurality of spot beams, at block 420. The plurality of frequency bands may each include a plurality of sub-bands. The spectrum usage map may include sub-bands among the plurality of sub-bands of the plurality of frequency bands that are suitable for the UE to use in the first spot beam.

According to some embodiments, monitoring of the radio spectrum in the plurality of spot beams by the MSS satellite may occur during one or more blanking intervals in a downlink from the MSS satellite. Dynamic frequency assignment to the UE may be performed based on the monitoring of the radio spectrum in the plurality of spot beams during the one or more blanking intervals.

Figure 5:
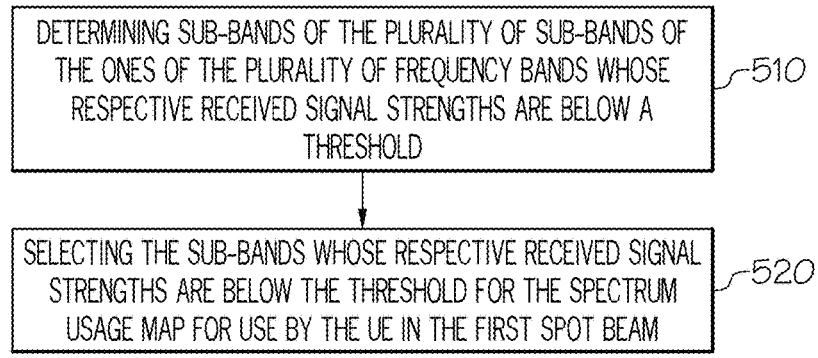

Referring to FIG. 5, according to some embodiments, the method may further include determining sub-bands among the plurality of sub-bands of the ones of the plurality of frequency bands whose respective received signal strengths are below a threshold, at block 510. The method may include selecting the sub-bands whose respective received signal strengths are below the threshold for the spectrum usage map for use by the UE in the first spot beam, at block 520. The plurality of spot beams of the MSS satellite may be directed towards earth at respective angles. Antennas of the MSS satellite may be configured to transmit and/or receive data in a plurality of frequency bands comprising the available frequency bands. The plurality of frequency bands may be used for communication in the plurality of spot beams of the MSS satellite. Respective gains of the antennas may be pre-calibrated for respective angles associated with ones of the plurality of spot beams.

Figure 6:
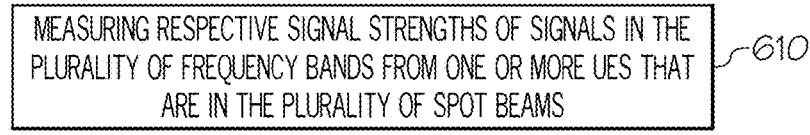

Referring to FIG. 6, various embodiments may include measuring respective signal strengths of signals in the plurality of frequency bands from one or more UEs that are in the plurality of spot beams, at block 610. Antennas of the MSS satellite may be configured to transmit and/or receive data in a plurality of frequency bands including the available frequency bands.

Figure 7:
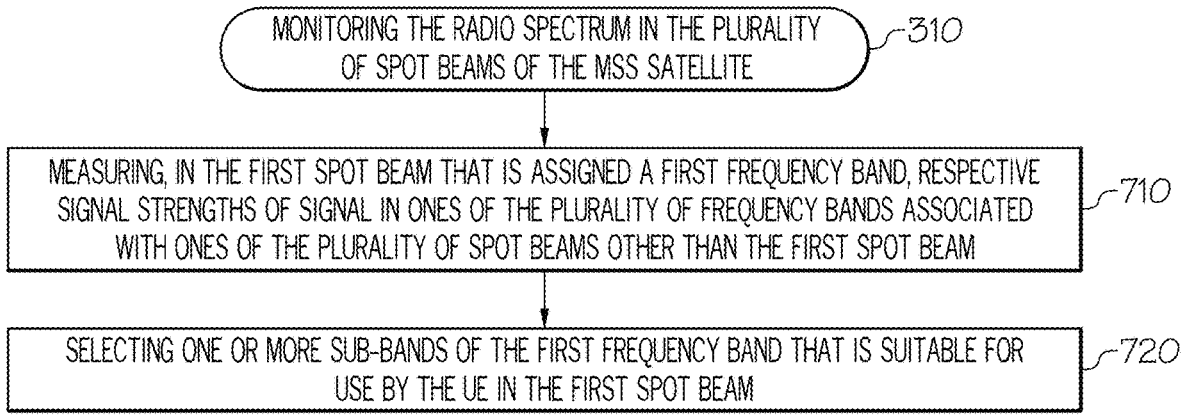

Referring to FIG. 7, According to some embodiments, the monitoring of the radio spectrum in the plurality of spot beams of the MSS satellite, at block 310, may include measuring, in the first spot beam that is assigned a first frequency band, respective signal strengths of signals in ones of the plurality of frequency bands associated with ones of the plurality of spot beams other than the first spot beam, at block 710. Various embodiments may include selecting one or more sub-bands of the first frequency band that is suitable for use by the UE in the first spot beam, 720.

Figure 8:
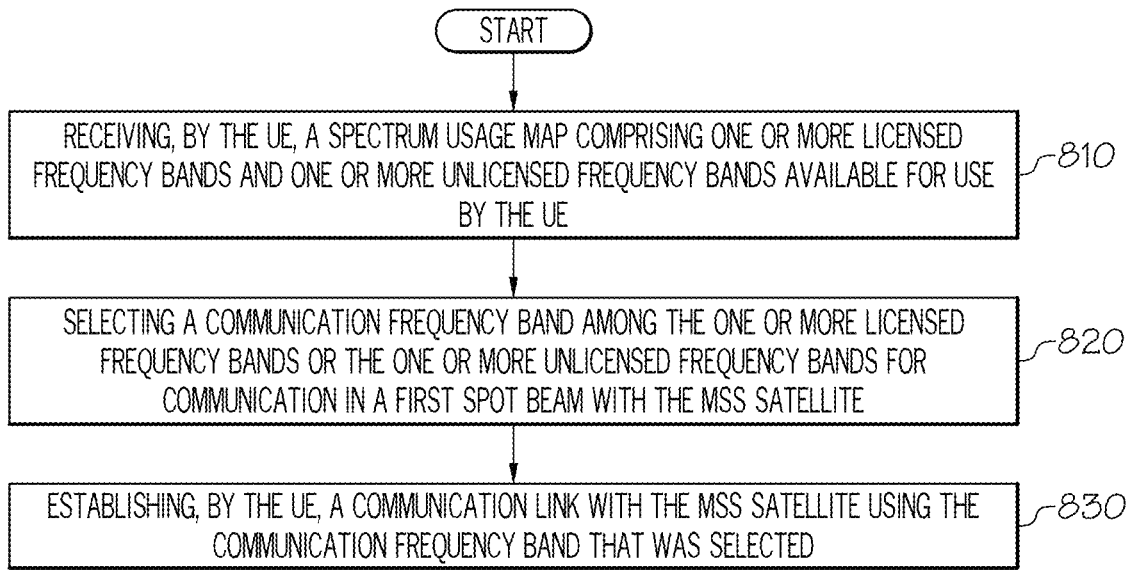

Referring to FIG. 8, various embodiments may include receiving, by the UE, a spectrum usage map including one or more licensed frequency bands and one or more unlicensed frequency bands available for use by the UE, at block 810. For example, UE 120 of FIG. 1 may receive the spectrum usage map from the MSS satellite 110. Various embodiments may include selecting a communication frequency band among the one or more licensed frequency bands or the one or more unlicensed frequency bands for communication in a first spot beam with the MSS satellite, at block 820. Various embodiments may include establishing, by the UE, a communication link with the MSS satellite using the communication frequency band that was selected, at block 830.

Figure 9:
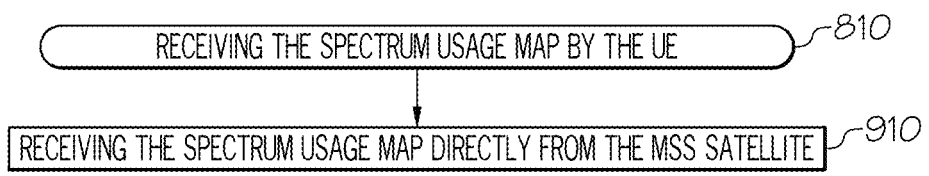
Figure 10:
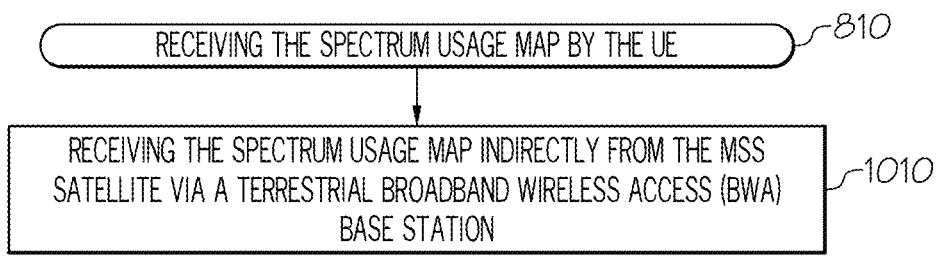

Referring to FIG. 9, receiving the spectrum usage map by the UE, at block 810, may include receiving the spectrum usage map directly from the MSS satellite, at block 910. Referring to FIG. 10, according to some embodiments, receiving the spectrum usage map by the UE, at block 810, may include receiving the spectrum usage map indirectly from the MSS satellite via a terrestrial Broadband Wireless Access (BWA) base station, at block 1010.

Figure 11:
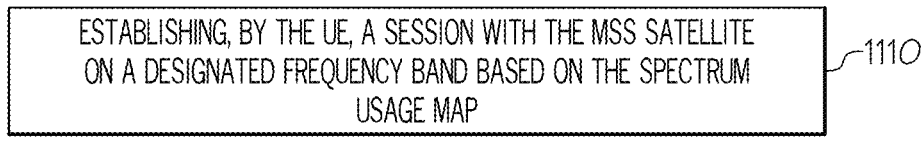

Referring to FIG. 11, receiving the spectrum usage map by the UE, at block 810, may include establishing, by the UE, a session with the MSS satellite on a designated frequency band based on the spectrum usage map, at block 1110. For example, UE 120 of FIG. 1 may establish a communication session with the MSS satellite 110.

Figure 12:

Referring to FIG. 12, the method may include receiving, by the UE from the MSS satellite, an order for the UE to switch to a different frequency band, at block 1210. The UE switching to a different frequency band may include switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands. According to some embodiments, the communication frequency band that was selected by the UE to communicate with the MSS satellite may include a first frequency band among a plurality of frequency bands that is assigned to a first spotbeam among a plurality of spot beams in which the UE is located or a first frequency sub-band in the first frequency band. The spectrum usage map may be based on monitoring radio spectrum in a plurality of spot beams by the MSS satellite. The spectrum usage map may be based on measuring respective signal strengths of signals in the plurality of frequency bands from one or more UEs that are in the plurality of spot beams. Ones of the plurality of frequency bands may each include a plurality of sub-bands. The spectrum usage map may include sub-bands of the plurality of sub-bands of the ones of the plurality of frequency bands that are suitable for the UE to use in the first spot beam. The plurality of spot beams of the MSS satellite may be directed towards earth at respective angles. The UE may be configured to transmit and/or receive data in a communication frequency band to and/or from one or more antennas of the MSS satellite, where the communication frequency band may be used for communication in the first spot beam of the MSS satellite. Respective gains of the one of more antennas of the MSS satellite may be pre-calibrated for respective angles associated with ones of a plurality of spot beams comprising the first spot beam.

Figure 13:
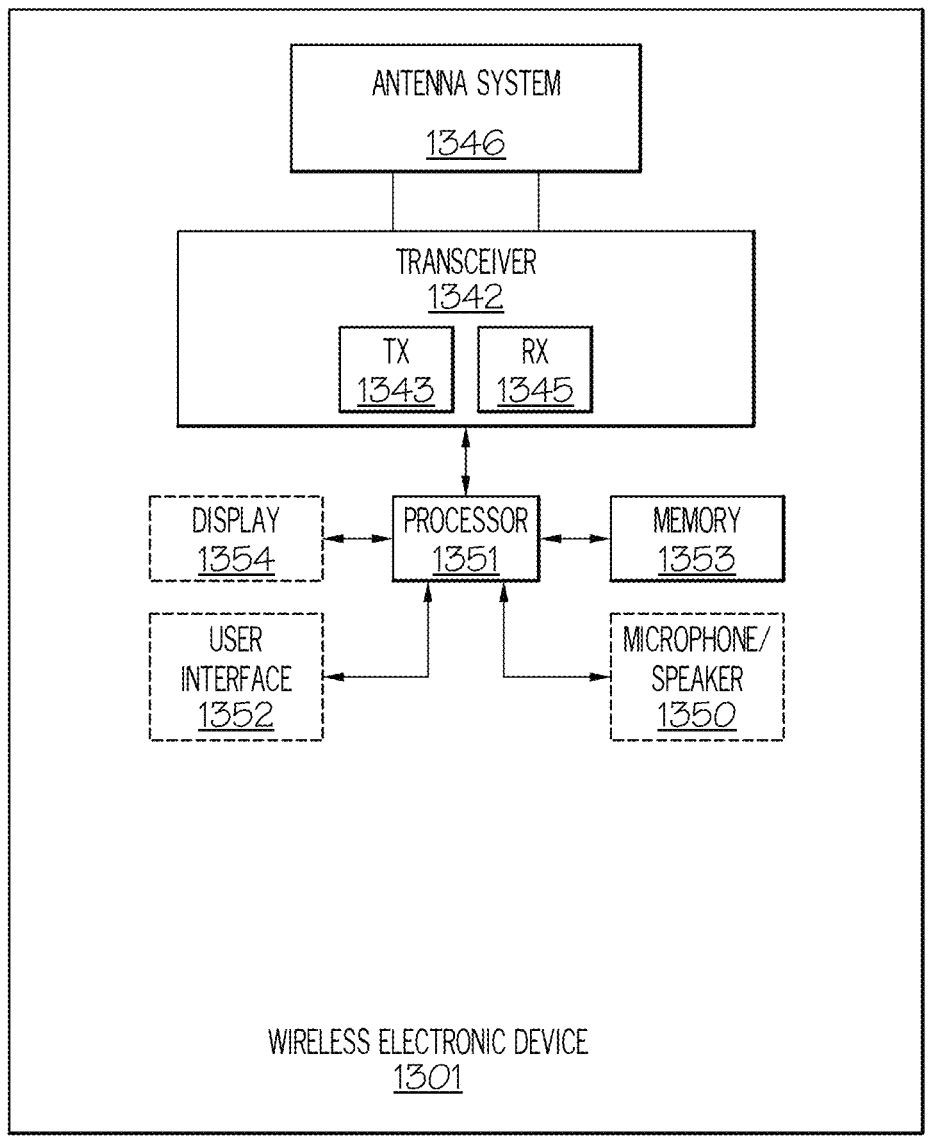
FIGS. 13 to 15 are block diagrams of various wireless electronic devices, according to some embodiments of the present inventive concepts.
Figure 14:
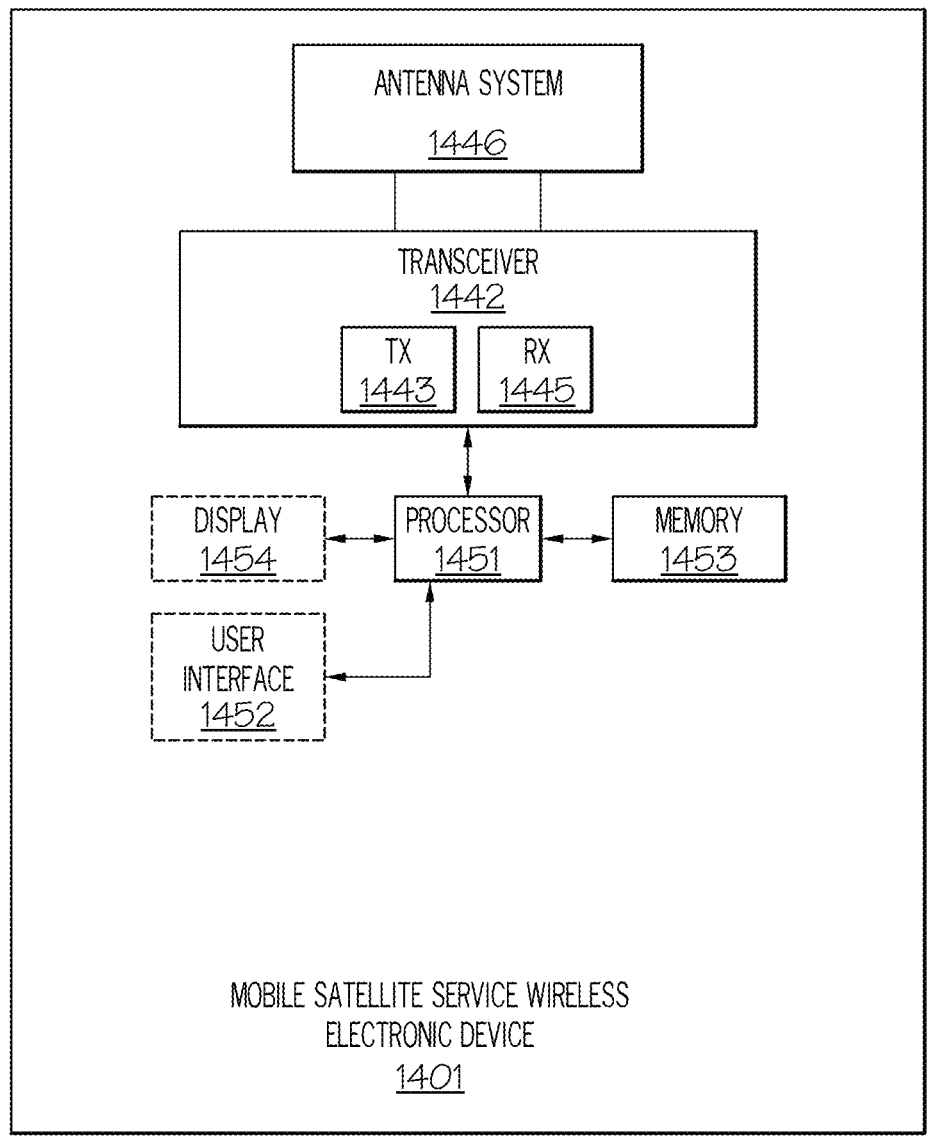
Figure 15:
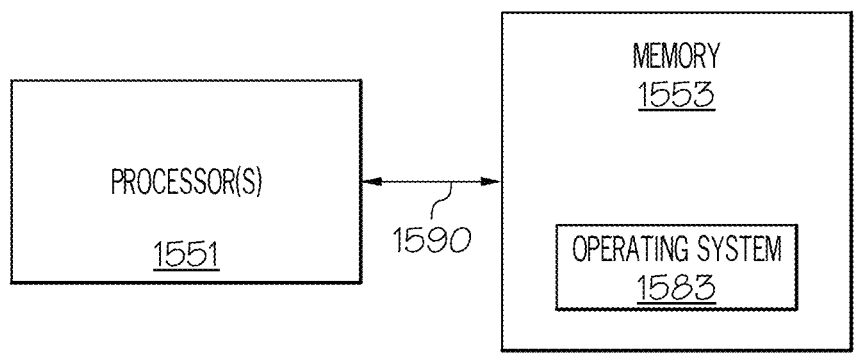

FIGS. 13, 14, and 15 are block diagrams of various electronic devices that may be used in a MSS system and/or a UE. Referring to FIG. 13, a block diagram is provided of a wireless electronic device which may correspond to one more of various elements of a UE 120, 130, or 140 of FIG. 1, according to some embodiments. Referring to FIG. 14, a block diagram is provided of a Mobile Satellite Service wireless electronic device, which may correspond to one or more of various MSS network elements such as MSS satellite 110 of FIG. 1, according to some embodiments.

As illustrated in FIG. 13, a wireless electronic device 1301 may include an antenna system 1346, a transceiver 1342, a processor (e.g., processor circuit) 1351, and a memory 1353. Moreover, the wireless electronic device 1301 may optionally include a display 1354, a user interface 1352, and/or a microphone/speaker 1350. The MSS wireless electronic device 1401 of FIG. 14 may have components that operate similarly to those of wireless electronic device 1301 of FIG. 13 and thus details will not be repeated.

The transmitter portions of transceivers 1342 or 1442 of FIGS. 13 and 14 may operate similarly to one another so each will not be described separately. Referring once again to FIG. 13, a transmitter portion 1343 of the transceiver 1342 may convert information, which is to be transmitted by the wireless electronic device 1301, into electromagnetic signals suitable for radio communications. A receiver portion 1345 of the transceiver 1342 may demodulate electromagnetic signals, which are received by the wireless electronic device 1301. The transceiver 1342 may include transmit/receive circuitry (TX/RX) that provides separate communication paths for supplying/receiving RF signals to different radiating elements of the antenna system 1346 via their respective RF feeds. Accordingly, when the antenna system 1346 includes two active antenna elements, the transceiver 1342 may include transmit circuit 1343 and/or receive circuit 1345 connected to different ones of the antenna elements via the respective RF feeds. For example, the transmit/receive circuits 1343/1345 may be connected to a Wi-Fi antenna, satellite antenna, MIMO antennas, a close/short-range (e.g., a Near-Field Communication (NFC), or BLUETOOTH®) antenna, cellular antenna, satellite antenna, or a 3G, 4G, LTE, or 5G antenna. Moreover, the antenna system 1346 and/or the transceiver 1342 may include a GPS receiver.

Referring still to FIG. 13, the memory 1353 may store computer program instructions that, when executed by the processor circuit 1351, carry out operations of the wireless electronic device 1301. In some embodiments, the memory 1353 can be a non-transitory computer readable storage medium including computer readable program code therein that when executed by the processor 1351 causes the processor 1351 to perform a method described herein. As an example, the memory 1353 may store an application which can perform the operations illustrated in various blocks of the flow charts of FIGS. 3 to 12. The memory 1353 can be, for example, a non-volatile memory, such as a flash memory, that retains the stored data while power is removed from the memory 1353. The memory 1453 or FIG. 14 and memory 1553 of FIG. 15 operate similarly to that of the memory 1353 of FIG. 13 and thus will not be discussed separately.

Referring once again to FIG. 13, wireless electronic device 1301 may be associated with a UE 120, 130, or 140 in a communication network served by MSS satellite 110 of FIG. 1. The wireless electronic device 1301 includes transceiver 1342 and a processor 1351 coupled to memory 1353, which is configured to store instructions that cause the processor 1351 to perform operations including receiving, by the UE 120, 130, or 140, a spectrum usage map comprising one or more licensed frequency bands and one or more unlicensed frequency bands available for use by the UE 120, 130, or 140, selecting a communication frequency band among the one or more licensed frequency bands or the one or more unlicensed frequency bands for communication in a first spot beam with the MSS satellite 110, and establishing, by the UE 120, 130, or 140, a communication link with the MSS satellite 110 using the communication frequency band that was selected.

Referring once again to FIG. 14, MSS wireless electronic device 1401 may be associated with a MSS satellite 110 of FIG. 1. Wireless electronic device 1400 may be configured to allocate spectrum to UE 120, 130, or 140 of FIG. 1. The processor 1451 is coupled to memory 1453, which is configured to store instructions that cause the processor 1451 to perform operations including monitoring, by the MSS satellite 110, radio spectrum in a plurality of spot beams of the MSS satellite 110, and determining a spectrum usage map of the radio spectrum in a first spot beam of the plurality of spot beams. The spectrum usage map may include available frequency bands such as licensed frequency bands and/or unlicensed frequency bands.

FIG. 15 illustrates a block diagram of an example processor 1551 and memory 1553 that may be used in accordance with various embodiments of the present inventive concepts. The processor 1551 communicates with the memory 1553 via an address/data bus 1590. The processor 1551 may be, for example, a commercially available or custom microprocessor. Moreover, the processor 1551 may include multiple processors. The memory 1553 is representative of the overall hierarchy of memory devices containing the software and data used to implement various functions as described herein. The memory 1553 may include, but is not limited to, the following types of devices: cache, ROM, PROM, EPROM, EEPROM, flash, Static RAM (SRAM), and Dynamic RAM (DRAM).

Still referring to FIG. 15, the memory 1553 may hold various categories of software and data, such as an operating system 1583. The processor 1551 and memory 1553 may correspond to any of the processors 1351 or 1451 and memories 1353 and 1453 of wireless electronic device 1301, or MSS wireless electronic device 1401 of FIG. 13 and/or FIG. 14. Accordingly, the operating system 1583 may control operations of the wireless electronic devices 1301 and/or 1401. In particular, the operating system 1583 may manage the resources of corresponding wireless electronic devices 1301 and/or 1401 and may coordinate execution of various programs performing operations described herein by the processor 1551.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

That which is claimed is:

1. A method of allocating spectrum by a Mobile Satellite Service (MSS) satellite to a User Equipment (UE), the method comprising:
   monitoring, by the MSS satellite, radio spectrum in a plurality of spot beams of the MSS satellite;
   determining a spectrum usage map of the radio spectrum in a first spot beam of the plurality of spot beams, wherein the spectrum usage map comprises available frequency bands comprising licensed frequency bands and unlicensed frequency bands; and
   transmitting the spectrum usage map for use by the UE in the first spot beam.

2. The method of claim 1, wherein the monitoring the radio spectrum in the plurality of spot beams of the MSS satellite comprises:
   receiving, by the MSS satellite, signals in a plurality of frequency bands from one or more UEs including the UE that are in the plurality of spot beams; and
   measuring respective signal strengths of the signals in the plurality of frequency bands from the one or more UEs that are in the plurality of spot beams.

3. The method of claim 2, wherein ones of the plurality of frequency bands each comprise a plurality of sub-bands.

4. The method of claim 3, wherein the spectrum usage map comprises sub-bands among the plurality of sub-bands of the ones of the plurality of frequency bands that are suitable for the UE to use in the first spot beam.

5. The method of claim 3, further comprising:
   determining sub-bands among the plurality of sub-bands of the ones of the plurality of frequency bands whose respective received signal strengths are below a threshold; and
   selecting the sub-bands whose respective received signal strengths are below the threshold for the spectrum usage map for use by the UE in the first spot beam.

6. The method of claim 1, wherein the plurality of spot beams of the MSS satellite are directed towards earth at respective angles.

7. The method of claim 1, wherein antennas of the MSS satellite are configured to transmit and/or receive data in a plurality of frequency bands comprising the available frequency bands, and
   wherein the plurality of frequency bands are used for communication in the plurality of spot beams of the MSS satellite.

8. The method of claim 7, wherein respective gains of the antennas are pre-calibrated for respective angles associated with ones of the plurality of spot beams.

9. The method of claim 7, further comprising:
measuring respective signal strengths of signals in the plurality of frequency bands from one or more UEs that are in the plurality of spot beams.

10. The method of claim 1, wherein antennas of the MSS satellite are configured to transmit and/or receive data in a plurality of frequency bands comprising the available frequency bands, and wherein the monitoring the radio spectrum in the plurality of spot beams of the MSS satellite comprises:
measuring, in the first spot beam that is assigned a first frequency band, respective signal strengths of signals in ones of the plurality of frequency bands associated with ones of the plurality of spot beams other than the first spot beam; and
selecting one or more sub-bands of the first frequency band that is suitable for use by the UE in the first spot beam.

11. The method of claim 1, wherein the monitoring of the radio spectrum in the plurality of spot beams by the MSS satellite occurs during one or more blanking intervals in a downlink from the MSS satellite.

12. The method of claim 1, further comprising:
performing dynamic frequency assignment to the UE based on the monitoring of the radio spectrum in the plurality of spot beams during the one or more blanking intervals.

13. A method of communication by a User Equipment (UE) in a communication network served by a Mobile Satellite Service (MSS) satellite, the method comprising:
receiving, by the UE, a spectrum usage map comprising one or more licensed frequency bands and one or more unlicensed frequency bands available for use by the UE;
selecting a communication frequency band among the one or more licensed frequency bands or the one or more unlicensed frequency bands for communication in a first spot beam with the MSS satellite; and
establishing, by the UE, a communication link with the MSS satellite using the communication frequency band that was selected.

14. The method of claim 13, wherein the receiving the spectrum usage map by the UE comprises:
receiving the spectrum usage map directly from the MSS satellite.

15. The method of claim 13, wherein the receiving the spectrum usage map by the UE comprises:
receiving the spectrum usage map indirectly from the MSS satellite via a terrestrial Broadband Wireless Access (BWA) base station.

16. The method of claim 13, further comprising:
establishing, by the UE, a session with the MSS satellite on a designated frequency band based on the spectrum usage map.

17. The method of claim 16, further comprising:
receiving, by the UE from the MSS satellite, an order for the UE to switch to a different frequency band; and
switching, by the UE, from a licensed frequency band of the one or more licensed frequency bands to an unlicensed frequency band of the one or more unlicensed frequency bands, or switching, by the UE, from the unlicensed frequency band of the one or more unlicensed frequency bands to the licensed frequency band of the one or more licensed frequency bands.

18. The method of claim 17, wherein the communication frequency band that was selected by the UE to communicate with the MSS satellite comprises a first frequency band among a plurality of frequency bands that is assigned to a first spotbeam among a plurality of spot beams in which the UE is located or a first frequency sub-band in the first frequency band.

19. The method of claim 13, wherein the spectrum usage map is based on monitoring radio spectrum in a plurality of spot beams by the MSS satellite.

20. The method of claim 18, wherein the spectrum usage map is based on measuring respective signal strengths of signals in the plurality of frequency bands from one or more UEs that are in the plurality of spot beams.

21. The method of claim 20, wherein ones of the plurality of frequency bands each comprise a plurality of sub-bands.

22. The method of claim 21, wherein the spectrum usage map comprises sub-bands among the plurality of sub-bands of the ones of the plurality of frequency bands that are suitable for the UE to use in the first spot beam.

23. The method of claim 19, wherein the plurality of spot beams of the MSS satellite are directed towards earth at respective angles.

24. The method of claim 13, wherein the UE is configured to transmit and/or receive data in a communication frequency band to and/or from one or more antennas of the MSS satellite, and
wherein the communication frequency band is used for communication in the first spot beam of the MSS satellite.

25. The method of claim 24, wherein respective gains of the one or more antennas of the MSS satellite are pre-calibrated for respective angles associated with ones of a plurality of spot beams comprising the first spot beam.

26. A method of allocating spectrum by a Mobile Satellite Service (MSS) satellite to a User Equipment (UE), the method comprising:
creating, by the MSS satellite, a blanking interval among downlink transmission intervals in a spot beam in a frequency band;
receiving, by the MSS satellite, signals from one or more UEs in the frequency band during the blanking interval;
measuring respective signal strengths of the signals from the one or more UEs in the frequency band;
determining a spectrum usage map of radio spectrum in the spot beam based on the respective signal strengths, wherein the spectrum usage map comprises available frequency bands comprising licensed frequency bands and unlicensed frequency bands; and
transmitting the spectrum usage map to the UE in the spot beam.

27. The method of claim 26, wherein creating the blanking interval comprises:
ceasing transmission, by the MSS satellite, in the spot beam in the frequency band for a time interval comprising the blanking interval.

28. A wireless electronic device associated with a Mobile Satellite Service (MSS) satellite, the wireless electronic device configured to allocate spectrum to a User Equipment (UE), the wireless electronic device comprising:
a transceiver; and
a processor coupled to a memory, wherein the memory is configured to store instructions that when executed by the processor cause the processor to perform operations comprising:
monitoring, by the MSS satellite, radio spectrum in a plurality of spot beams of the MSS satellite;

determining a spectrum usage map of the radio spectrum in a first spot beam of the plurality of spot beams, wherein the spectrum usage map comprises available frequency bands comprising licensed frequency bands and unlicensed frequency bands; and wherein the transceiver is configured to transmit the spectrum usage map to the UE in the first spot beam.

29. A wireless electronic device associated with a User Equipment (UE) in a communication network served by a Mobile Satellite Service (MSS) satellite, the wireless electronic device comprising:

a transceiver; and a processor coupled to a memory, wherein the memory is configured to store instructions that when executed by the processor cause the processor to perform operations comprising:

receiving, a spectrum usage map comprising one or more licensed frequency bands and one or more unlicensed frequency bands available for use by the UE;

selecting a communication frequency band among the one or more licensed frequency bands and the one or more unlicensed frequency bands for communication in a first spot beam with the MSS satellite; and establishing, using the transceiver, a communication link with the MSS satellite using the communication frequency band that was selected.

30. A wireless electronic device associated with a Mobile Satellite Service (MSS) satellite, the wireless electronic device configured to allocate spectrum to a User Equipment (UE), the wireless electronic device comprising:

a transceiver; and a processor coupled to a memory, wherein the memory is configured to store instructions that when executed by the processor cause the processor to perform operations comprising:

creating, by the MSS satellite, a blanking interval among downlink transmission intervals in a spot beam in a frequency band;

receiving, by the MSS satellite, signals from one or more UEs in the frequency band during the blanking interval;

measuring respective signal strengths of the signals from the one or more UEs in the frequency band;

determining a spectrum usage map of radio spectrum in the spot beam based on the respective signal strengths, wherein the spectrum usage map comprises available frequency bands comprising licensed frequency bands and unlicensed frequency bands; and transmitting the spectrum usage map to the UE in the spot beam.

* * * * *